D. E. SELDERS.
MOTION TRANSMITTING DEVICE.
APPLICATION FILED JAN. 29, 1910.

969,910.

Patented Sept. 13, 1910.

Witnesses

Inventor
D. E. Selders
By James J. Sheehy
Attorney though, by changing the position of the lever
UNITED STATES PATENT OFFICE.

DAVID E. SELDERS, OF VAN ORIN, ILLINOIS.

MOTION-TRANSMITTING DEVICE.

969,910.  Specification of Letters Patent. Patented Sept. 13, 1910.

Application filed January 29, 1910. Serial No. 540,886.

*To all whom it may concern:*

Be it known that I, DAVID E. SELDERS, a citizen of the United States, residing at Van Orin, in the county of Bureau and State of Illinois, have invented new and useful Improvements in Motion-Transmitting Devices, of which the following is a specification.

My present invention relates to means for transmitting rotary motion to devices to be rotated; and it consists in the peculiar and advantageous device hereinafter described and definitely claimed.

Figure 1:
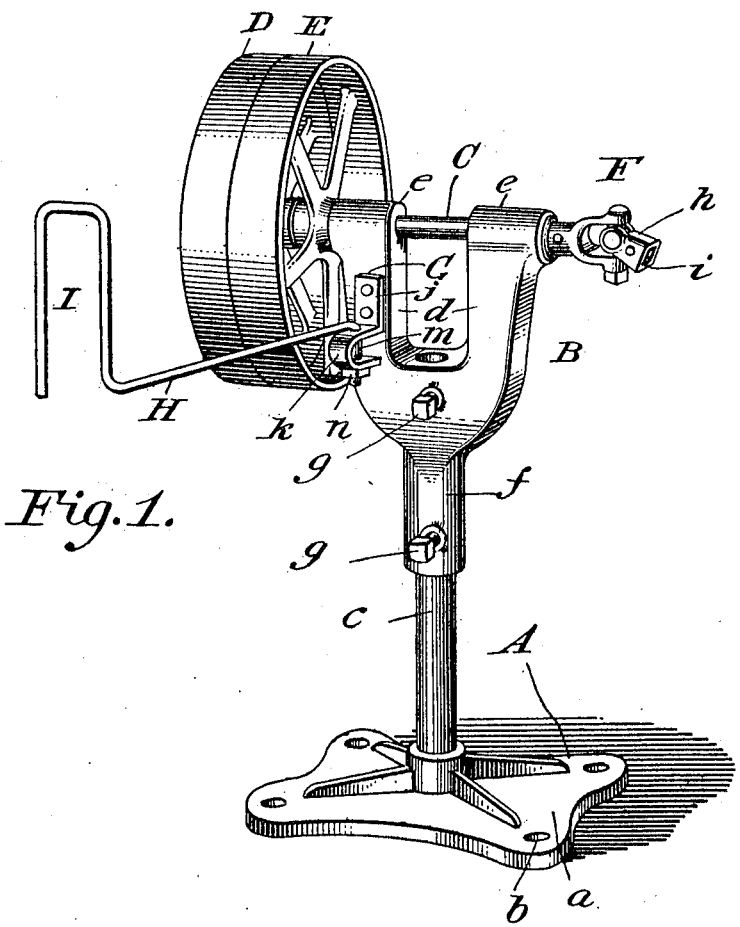
Figure 2:
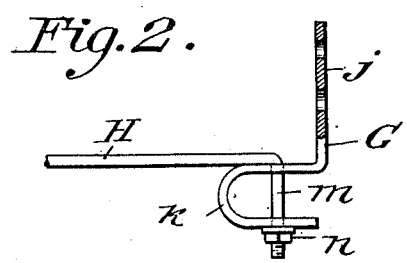

In the drawings, accompanying and forming part of this specification: Figure 1 is a perspective view of my novel device. Fig. 2 is an enlarged detail view, partly in elevation and partly in section, illustrative of the manner in which the belt-shifting lever is connected with the bracket by which said lever is carried.

Similar letters designate corresponding parts in both views of the drawings, referring to which:

A is the lower member of the main frame comprised in my novel device, and B is the upper member of said frame. The lower member A comprises a base plate $a$ having apertures $b$ for the passage of screws (not shown) by which it may be fixedly connected to a floor, and a central upright $c$, of circular form in cross-section, fixed to and rising from the base. The upper member B comprises standards $d$ on which are alined journal boxes $e$, and a vertically-disposed depending sleeve $f$, of circular form in cross-section, integral with said standards. The said sleeve $f$ of the member B is designed to receive the upright $c$ of member A, as shown, and is also designed to be turned and adjusted vertically on said upright $c$ so as to properly position the shaft, hereinafter described, for connection to the shaft or trunnion of the device to be rotated. One or more (preferably two) screws $g$ are carried by the sleeve $f$ and these are adapted to be set against the upright $c$ with a view of adjustably fixing the frame member B with respect to the member A.

Journaled in the boxes $e$ of the frame member B is a shaft C, and mounted on said shaft at one side of the member are fast and loose pulleys D and E, designed for the connection of a band (not shown) leading from a suitable source of power. At the opposite side of the member B, with reference to the pulleys D and E, the shaft C is provided with a universal joint F, the outer section $h$ of which is provided with a socket $i$, of angular form in cross-section, designed to receive the angular end on the shaft or trunnion of the device to be rotated.

G is a bracket having a stem $j$ that is screwed or otherwise fixed to the frame member B, and also having a resilient or springy and apertured loop $k$, and H is a belt-shifting lever having at its outer end a loop I to receive the belt (not shown). At its inner end the lever H is provided with an angular stem $m$, and the said stem is journaled in the apertures in the opposite portions of the bracket loop $k$ and is threaded adjacent its end to receive a nut $n$. By turning the said nut up on the stem $m$ the loop $k$ is put under tension, and consequently said loop serves, by tending to resume its normal state, to exert pressure against the nut, and in that way prevents casual swinging of the lever H without interfering with the manual swinging of the lever necessary to shift the belt from the fast pulley to the loose pulley and vice versa. From this it follows that when the lever is swung to shift the belt from one pulley to the other, there is no liability of the belt accidentally moving back to the first-named pulley.

My novel device is designed more particularly for transmitting motion to the rotary body of a churn located alongside the device, and when the square end of one of the trunnions on the churn body is placed in the socket $i$ of the universal joint F, and the shaft C is rotated, it will be understood that the churn body will also be rotated. It will also be understood that my novel device is calculated to hold the churn perfectly steady and hence there is no necessity of fastening the frame of the latter to the floor. It will further be gathered from the foregoing that my novel device is adjustable to churns and other devices of various heights; that it permits of the churn or other device to be actuated being set at an angle; and that when it is used, the connected churn or other device may be started or stopped slowly, as occasion demands.

While I have shown the bracket G and lever H for use in connection with a belt extending horizontally from the pulleys D and E, I would have it understood that the said bracket G may be fixed in a position at a right angle to the position shown in Fig. 1, in which event the lever H would be disposed upright to coöperate with a belt extending vertically from the pulleys—i. e., from the pulleys to an overhead shaft.

The construction herein illustrated and described constitutes the best practical embodiment of my invention that I have as yet devised, but it is obvious that in the future practice of the invention such changes or modifications may be made as do not involve departure from the spirit of the invention as claimed.

Having described my invention, what I claim and desire to secure by Letters-Patent, is:

A device for the purpose described, comprising a lower frame-member having a base plate and an upright, of circular form in cross-section, on the base plate, an upper frame-member having a sleeve adjustable vertically and adapted to turn on the upright of the lower member, means for adjustably fixing the sleeve of the upper member to the upright of the lower member, a shaft journaled in the upper frame member, fast and loose pulleys on said shaft, a universal joint on the shaft at one end thereof, a bracket fixed to the upper frame member and having a resilient loop, a belt-shifting lever having an angular stem journaled in the opposite portions of said loop, and a nut threaded on said stem and bearing against one of the said portions of the resilient loop.

In testimony whereof I have hereunto set my hand in presence of two subscribing witnesses.

DAVID E. SELDERS.

Witnesses:
J. F. HAMILTON,
JOHN QUINN.